(12) United States Patent
Zhao et al.

(10) Patent No.: US 8,568,892 B2
(45) Date of Patent: Oct. 29, 2013

(54) COATED ARTICLES

(75) Inventors: Chen Zhao, Newark, DE (US); David Volsin, Midlothian, VA (US); Cornell Chappell, Jr., Petersburg, VA (US)

(73) Assignee: DuPont Teijin Films U.S. Limited Partnership, Chester, VA (US)

( * ) Notice: Subject to any disclaimer, the term of this patent is extended or adjusted under 35 U.S.C. 154(b) by 546 days.

(21) Appl. No.: 12/740,235

(22) PCT Filed: Oct. 29, 2008

(86) PCT No.: PCT/US2008/081529
§ 371 (c)(1),
(2), (4) Date: Jul. 14, 2010

(87) PCT Pub. No.: WO2009/058821
PCT Pub. Date: May 7, 2009

(65) Prior Publication Data
US 2010/0297451 A1 Nov. 25, 2010

Related U.S. Application Data

(60) Provisional application No. 60/984,181, filed on Oct. 31, 2007.

(51) Int. Cl.
*B32B 23/00* (2006.01)
*B32B 23/08* (2006.01)
*B32B 23/18* (2006.01)
*B32B 27/06* (2006.01)
*B32B 27/08* (2006.01)
*B32B 27/18* (2006.01)
*B32B 27/20* (2006.01)
*B32B 27/34* (2006.01)
*B32B 27/36* (2006.01)

(52) U.S. Cl.
USPC ............... 428/475.2; 428/474.4; 428/480; 428/481; 428/910; 525/410; 106/163.01; 264/288.4; 264/289.3; 264/289.6; 264/290.2

(58) Field of Classification Search
None
See application file for complete search history.

(56) References Cited

U.S. PATENT DOCUMENTS

| | | | |
|---|---|---|---|
| 4,008,203 A | 2/1977 | Jones | |
| 4,439,479 A * | 3/1984 | Kanai et al. | 428/148 |
| 4,492,719 A * | 1/1985 | Kanai et al. | 427/171 |
| 4,670,319 A * | 6/1987 | Katoh et al. | 428/141 |
| 5,025,061 A * | 6/1991 | Ishidoya et al. | 524/539 |
| 5,262,475 A | 11/1993 | Creasy | |
| 5,411,845 A | 5/1995 | Robinson | |
| 5,804,612 A | 9/1998 | Song et al. | |
| 5,814,684 A | 9/1998 | Yoshioka | |
| 5,882,798 A | 3/1999 | Hubbard et al. | |
| 5,925,428 A | 7/1999 | Hubbard et al. | |
| 5,997,621 A | 12/1999 | Scholz et al. | |
| 6,117,532 A | 9/2000 | Siddiqui et al. | |
| 6,124,042 A * | 9/2000 | Hashimoto | 428/480 |
| 6,130,278 A * | 10/2000 | Hibiya et al. | 524/322 |
| 6,156,409 A | 12/2000 | Doushita et al. | |
| 6,348,267 B1 * | 2/2002 | Okajima | 428/423.7 |
| 6,455,142 B1 | 9/2002 | Herberger et al. | |
| 6,458,467 B1 * | 10/2002 | Mizuno et al. | 428/480 |
| 6,521,398 B2 * | 2/2003 | Claes et al. | 430/519 |
| 6,560,026 B2 | 5/2003 | Gardiner et al. | |
| 6,649,260 B2 | 11/2003 | Kumano et al. | |
| 6,787,202 B2 * | 9/2004 | Mizutani et al. | 428/1.54 |
| 6,828,010 B2 * | 12/2004 | Kubota et al. | 428/213 |
| 6,921,580 B2 * | 7/2005 | Akatsu et al. | 428/480 |
| 6,945,656 B2 | 9/2005 | Takahashi et al. | |
| 7,703,456 B2 | 4/2010 | Yahiaoui et al. | |
| 2002/0136843 A1 | 9/2002 | Chopra et al. | |
| 2003/0203991 A1 | 10/2003 | Schottman et al. | |
| 2004/0109958 A1 | 6/2004 | Nigam et al. | |
| 2004/0132857 A1 * | 7/2004 | Barton et al. | 522/168 |
| 2004/0247804 A1 | 12/2004 | Kim et al. | |
| 2006/0078718 A1 | 4/2006 | Konrad et al. | |
| 2007/0166344 A1 | 7/2007 | Qu et al. | |

FOREIGN PATENT DOCUMENTS

| | | |
|---|---|---|
| EP | 0 001 879 A1 | 5/1979 |
| EP | 0 184 458 A2 | 6/1986 |
| EP | 0 408 197 A2 | 1/1991 |
| EP | 0 529 697 A1 | 3/1993 |
| FR | 2 833 163 A1 | 6/2003 |
| JP | 6-155892 | 6/1994 |
| JP | 2000-309068 | 11/2000 |
| JP | 2005-314495 A | 11/2005 |
| WO | WO 00/38750 A1 | 7/2000 |
| WO | WO 00/46039 A1 | 8/2000 |
| WO | WO 03/037641 A2 | 5/2003 |
| WO | WO 03/050193 A1 | 6/2003 |
| WO | WO 2006/043072 A1 | 4/2006 |

OTHER PUBLICATIONS

International Search Report and Written Opinion mailed Jan. 16, 2009.
Masuda, Ryodo, Notice of Reasons for Rejection dated Jan. 4, 2013, Japanese Application No. 2010-532195, 3 pages; Translation, 3 pages.

* cited by examiner

*Primary Examiner* — Vivian Chen
(74) *Attorney, Agent, or Firm* — RatnerPrestia

(57) ABSTRACT

A coated article includes a substrate having on its surface a coating that includes a polymer selected from the group consisting of hydroxypropylcellulose, poly(2-ethyl-2-oxazoline) and mixtures of these, a surfactant, colloidal silica, and a crosslinker selected from the group consisting of water-soluble titanium salts and water-soluble or water-dispersible organic crosslinkers. The coating may be formed by applying a dispersion of the coating composition in a diluent to the substrate and subsequently drying the coated substrate to evaporate the diluent.

12 Claims, No Drawings

COATED ARTICLES

This application is a national stage filing of PCT Application No. US2008/081529, filed Oct. 29, 2008, and claims priority of U.S. Application No. 60/984,181, filed Oct. 31, 2007, the entirety of both of which applications are incorporated herein by reference.

BACKGROUND OF THE INVENTION

Glass or plastic materials used for windows, mirrors, lenses, goggles, and facial masks or shields become foggy when they are exposed to high humidity and temperature, or used at interfacial boundaries with a large difference in temperature or humidity. Products exposed to such conditions include those used in medical, military and industrial safety applications. Fog is caused by the condensation of moisture on the surface. For example, exhaled air from a person wearing a safety shield could cause fogging. To reduce or eliminate this problem, anti-fog coatings are frequently needed. These typically include hydrophilic materials that overcome fogging by absorbing and releasing moisture from the surface. In many of these applications, it is also important that the coating be substantially transparent and not generate excessive glare, which results from reflection of light. Thus, anti-glare properties are desirable. Anti-glare properties are also of value in making certain optical devices, such as optical retardation plates or polarizing plates, and can for example be used in display devices such as liquid crystal displays.

Anti-glare and anti-fog coatings may also be needed for use on disposable items such as single-use facemasks, which typically are based on polymer film substrates. For these and other applications, it is desirable that cost be kept to a minimum, and therefore in-line application methods would in many cases be desirable in order to keep costs low. However, existing anti-glare and anti-fog compositions capable of providing suitable anti-fog and anti-glare properties are often not easily applied by in-line processes. There is a continuing need for anti-glare and anti-fog coatings, and methods of applying them, capable of addressing these needs.

SUMMARY OF THE INVENTION

In one aspect, the invention provides a composite film including a polyester film substrate having first and second sides, and on at least one of the first and second sides a coating including a polymer selected from the group consisting of hydroxypropylcellulose, poly(2-ethyl-2-oxazoline) and mixtures of these, a surfactant, colloidal silica, and a crosslinker selected from the group consisting of water-soluble titanium salts and water-soluble or water-dispersible organic crosslinkers.

In another aspect, the invention provides a method of making a composite film, including the steps of:

a) providing an unoriented or monoaxially oriented polyester film substrate having first and second sides;

b) forming on at least one of the first and second sides coating including a polymer selected from the group consisting of hydroxypropylcellulose, poly(2-ethyl-2-oxazoline) and mixtures of these, a surfactant, colloidal silica, and a crosslinker selected from the group consisting of water-soluble titanium salts and water-soluble or water-dispersible organic crosslinkers, the forming including contacting the at least one side with a dispersion of the polymer, surfactant, colloidal silica and crosslinker in an aqueous diluent and then evaporating the aqueous diluent; and c) subsequent to step b), stretching the unoriented or monoaxially oriented polyester film substrate to respectively monoaxially or biaxially orient the substrate.

In yet another aspect, the invention provides a polymeric or glass article having on a surface thereof a coating including a polymer selected from the group consisting of hydroxypropylcellulose, poly(2-ethyl-2-oxazoline) and mixtures of these, a surfactant, colloidal silica, and a crosslinker selected from the group consisting of water-soluble titanium salts and water-soluble or water-dispersible organic crosslinkers.

In still another aspect, the invention provides a composition for coating an article, wherein the composition includes, in an aqueous diluent, a dispersion including a polymer selected from the group consisting of hydroxypropylcellulose, poly(2-ethyl-2-oxazoline) and mixtures of these, a surfactant, colloidal silica, and a crosslinker selected from the group consisting of water-soluble titanium salts and water-soluble or water-dispersible organic crosslinkers.

In a further aspect, the invention provides a coating including a polymer selected from the group consisting of hydroxypropylcellulose, poly(2-ethyl-2-oxazoline) and mixtures of these, a surfactant, colloidal silica, and a crosslinker selected from the group consisting of water-soluble titanium salts and water-soluble or water-dispersible organic crosslinkers.

DETAILED DESCRIPTION OF THE INVENTION

The present invention provides polyester films bearing on their surface an anti-fog and anti-glare composition. Depending on the intended application for the polyester film, the coating may be applied to one or both sides of the film. If both sides are coated, the same composition will typically be used for both, although different ones may be used.

As will be discussed in detail further below, anti-glare and anti-fog coating compositions may be applied by in-line or off-line processes, with the former being preferred in some embodiments. However, the studies leading up to this invention revealed that traditional formulations for forming anti-fog and anti-glare coatings are often not suitable for application prior to a subsequent draw step (for example, during the interdraw phase, i.e., between a first and a second drawing step) in an in-line process, because the draw results in crazes and/or cracks in the coating. This results in deteriorated optical properties, such as poor anti-glare performance. The compositions described herein may be used for either type of coating process without cracking or crazing, and thus represent a significant advance in anti-fog and anti-glare coating technology. Further, the resulting coatings may be quite thin, allowing additional cost reduction.

Although one particularly useful application of the coating compositions of this invention is for use on films, the compositions may be applied to the surface of any article. Polymeric or glass articles may be of particular utility, especially if they are transparent. Exemplary glass articles include films, sheets/plates, mirrors, and eyeglasses or other optical devices. Aqueous dispersions of the compositions, and dried films made from the compositions, are also embodiments of the invention without respect to whether they are in the form of coatings on a substrate.

Coated films of this invention may have both anti-glare and high light-scattering properties, as well as provide high visibility of a transmitted image. Such films may be used directly as a part in an optical device, or may form a portion of such a part. Examples of such parts include polarizing plates, light guides, and optical retardation plates. Thus, films according to the invention may be laminated or otherwise disposed on at least one light path surface of an optical retardation plate, for example. The films may be utilized for various display devices such as a touch panel display devices, plasma displays and liquid crystal displays. For example, display devices may incorporate a polarizing plate to which the film has been laminated.

For reflective-type liquid crystal displays, the film-laminated polarizing plate may be disposed in a forward light path from the reflective member. For example, it may be laminated or otherwise located between the reflective member and the display unit. For transmissive-type liquid crystal displays, a backlight source may be used that includes a light guide plate and a light source (such as a light emitting diode). The anti-glare film may be disposed in the light path in front of the light source, for example it may be disposed or laminated between the light guide plate and the display unit.

Coating compositions useful for practicing the invention will now be described with respect to the ingredients that are used to prepare them. The skilled artisan will be aware that a variety of chemical reactions (for example, crosslinking) may occur between the various components of coating compositions either before or after application and drying, and accordingly when compositions are described they are meant to refer both to the ingredients themselves and to the products of such reactions, if any. The final coatings will be described in terms of the ingredients used to prepare them, and it is to be understood that the coatings may include reaction products of the various ingredients in addition to or instead of the ingredients themselves. The term "active ingredients" will mean all ingredients other than water or other volatile diluent.

Anti-Glare and Anti-Fog Coating Compositions

Coating compositions according to the invention include a polymer selected from the group consisting of hydroxypropylcellulose and poly(2-ethyl-2-oxazoline), a surfactant, colloidal silica, and a crosslinker.

Suitable surfactants include anionic, cationic, and nonionic surfactants. Exemplary surfactants include TEGO-WET® 251 polyether modified polysiloxane surfactant (Tego Chemie Service GmbH, Division of Degussa, Essen, Germany), and MASIL® 1066C, a polymeric nonionic silicone surfactant with a comb or rake structure consisting of a polydimethylsiloxane backbone with graft or pendant polyoxyalkylene hydrophiles (PPG Industries, Inc., Gurnee, Ill.). Other suitable surfactants include DYNOL 604 2,5,8,11-tetramethyl-6-dodecyn-5,8-diol ethoxylate (Air Product and Chemicals, Inc, Allentown, Pa.); BYK 302 and 333 Polyether modified dimethylpolysiloxane copolymers (BYK Additives & Instruments 46483 Wesel, Germany); and TWEEN® 20 and 21 polyoxyethylene sorbitan monolaurate (Uniqema, 1000 UNIQEMA blvd., New Castle, Del.). The surfactant will typically be present in a range from 1 to 60 wt % of total active ingredients, and more typically in a range of 4 to 15 wt %.

Suitable colloidal silicas include anionic, cationic, and nonionic colloidal silicas. Exemplary colloidal silicas include SNOWTEX-UP® colloidal silica (Nissan Chemical Industries, LTD, Tokyo, Japan) and SYTON® HT-50 colloidal silica slurry (DA NanoMaterials LLC, Tempe, Ariz.). Other suitable colloidal silicas include NALCO® 1030 and 1034 colloidal silica (Nalco, Naperville, Ill.) and NEXSIL™ 85K and 125K colloidal silica (Nyacol Nano Technologies, Inc., Ashland, Mass.). The colloidal silica will typically be present in a range from 1.0 to 12 wt % of total active ingredients, and more typically in a range of 1.5 to 2.5 wt %.

Suitable crosslinkers include water-soluble titanium salts. One example is TYZOR® LA lactic acid, titanium chelate, ammonium salt, water based; titanate(2-), dihydroxy bis[2-hydroxypropanato(2-)—O$^1$, O$^2$], ammonium salt, available from DuPont, Wilmington, Del. Other suitable salts include TYZOR® CLA Titanate, a reactive organic titanium chelate with triethanolamine and acetylacetonate as chelating agents, containing 23% of free isopropanol; TYZOR® TE Titanate Titanium, bis[[2,2',2"-nitrilotris[ethanolato]] (1-)—N,O]bis (2-2-propanolato)-; TYZOR® 131 titanate mixed titanium ortho ester complexes; and TYZOR® 217 sodium zirconium lactate, all from DuPont, Wilmington, Del.

Other suitable crosslinkers include water-soluble or water-dispersible organic crosslinkers. Examples of such include epoxy resins, melamine-formaldehyde resins, and oxazoline-functional polymers. As epoxy resins, the following examples may be mentioned: COATOSIL® 1770 2-(3,4-epoxycyclohexyl)ethyltriethoxysilane, water-borne (Momentive Performance Materials, Wilton, Conn.), and D.E.R.™ 732 liquid epoxy resin, reaction product of epichlorohydrin and polypropylene glycol (Dow Chemical Company, Midland, Mich.). One exemplary melamine-formaldehyde resin is sold by Cytec Industries, Inc., West Paterson, N.J. under the name CYMEL® 350 alkylated melamine-formaldehyde resin. An exemplary oxazoline-functional resin is sold under the name EPOCROS™ WS-700 oxazoline-functional water-soluble copolymer by Nippon Shokubai Co., LTD, Osaka, Japan. Several exemplary isocyanate-functional resins are sold under the name RHODOCOAT™ WAT 1 aliphatic polyisocyanate and RHODOCOAT™ WT 1000 methylethylketoxime-blocked homopolymer of hexamethylene diisocyanate from Rhodia Inc., Cranbury, N.J.

Other suitable water-soluble or water-dispersible organic crosslinkers include aqueous solutions of ammonia salts of styrene maleic anhydride copolymer partial monoesters. Examples include SMA 1440H Styrene Maleic Anhydride Copolymer Solution and SMA 2625H, Styrene Maleic Anhydride Copolymer Solution, both available from Sartomer Company of Exton, Pa.

The crosslinker will typically be present in a range from 2 to 20 wt % of total active ingredients, and more typically in a range of 5 to 10 wt %.

In some embodiments of the invention, the coating compositions are free of aluminum, and in particular they may be free of insoluble inorganic aluminum compounds such as alumina and alumina trihydrate. The inventors have found that such materials may in at least some cases result in compositions that produce cracked or crazed coatings, which would defeat the purposes of this invention.

In some embodiments of the invention, the hydroxypropylcellulose and/or poly(2-ethyl-2-oxazoline) are the only polymers present in the composition, apart from the surfactant and the crosslinker (each of which in some embodiments may be polymeric). In some embodiments, any or all of the following classes of polymeric material may be undesirable in certain situations and thus may be excluded from the compositions: polyethylene oxides, polyethylene glycols, polymers with multiple sulfonic groups, polyesters, acrylamide (co)polymers, acrylate (co)polymers, N-vinylpyrrolidone (co)polymers, vinyl alcohol (co)polymers, polyurethanes, polyureas, cellulose esters or ethers (other than hydroxypropylcellulose), and gelatins.

Coating compositions such as described above will typically be applied as a dispersion in a volatile diluent, which may include a solvent. In most cases, the diluent will be aqueous, which as used herein means that the diluent is at least 50 wt % water. In some embodiments, the aqueous diluent is at least 90 wt % water, and in many cases it will be 100 wt % water. Such dispersions will typically have total solids in a range from 0.5 to 15 wt %, and more typically in a range of 2 to 5 wt %. As is well known to those skilled in the art, "total solids" refers to the amount of non-volatile material present in the coating composition even though some of the non-volatile material present may be a liquid at room temperature.

The viscosity of the dispersed coating composition will typically be in a range from 1 to 100 Pas for gravure-type coating methods, but can be greater than 100 Pas for other coating methods. In addition, it is desirable that the functional components are compatible with each other to allow dispersed coating composition to be stable in storage and also stable to the conditions (such as high shear) of coating techniques without particle flocculation, aggregation, crystallization, or other deterioration in properties.

Preparation of Composite Films

Any polymeric, typically in the form of a film, is suitable for use as a substrate according to the invention. Thermoplastic polymers are typically used. Non-limiting examples include polyesters, such as polyethylene terephthalate or polybutylene terephthalate; polyacrylates, such as polymethylmethacrylate; polystyrenes or acrylate copolymers; nylon; polybutyrate; polypropylene; polyethylene; polybutene; olefin copolymers; polycarbonate; and polyacrylonitrile.

The polymeric film may also comprise a polyarylether or thio analogue thereof, particularly a polyaryletherketone, polyarylethersuiphone, polyaryletheretherketone, polyaryletherethersulphone, or a copolymer or thio analogue thereof. Examples of these polymers are disclosed in EP-A-1879, EP-A-184458 and U.S. Pat. No. 4,008,203. The polymeric film may comprise a poly(arylene sulphide), particularly poly-p-phenylene sulphide or copolymers thereof. Blends of the aforementioned polymers may also be employed.

Suitable thermoset resin polymeric materials may also be used as substrates according to the invention. Examples include addition-polymerization resins such as acrylics, vinyls, bis-maleimides and unsaturated polyesters; formaldehyde condensate resins such as condensates with urea, melamine or phenols; cyanate resins; functionalised polyesters; and polyamides or polyimides.

The substrate may in some embodiments be a multi-layer film. For example, the film may comprise a base layer such as polyethylene terephthalate and a heat-sealable layer provided thereon. Such a heat-sealable layer may be provided by coating from a solvent, or by any other means. In some embodiments, it is effected by coextrusion, either by simultaneous coextrusion of the respective film-forming layers through independent orifices die, and thereafter uniting the still molten layers, or preferably, by single-channel coextrusion in which molten stream of the respective polymers are first united within a channel leading to a die manifold, and thereafter extruded together from a die orifice under conditions of streamline flow without intermixing to produce a multi-layer polymeric film, which may be oriented and heat-set as described previously herein.

In some embodiments of the invention, the substrate is includes a crystalline polyester prepared from the polycondensation of one or more glycols or diols (such as ethylene or propylene glycol or butane diol) with one or more diacids or esters (typically methyl esters) thereof. Suitable diacids include terephthalic acid, naphthalene dicarboxylic acid, isophthalic acid, diphenic acid and sebacic acid. Exemplary polyester films useful in the present invention include polyethylene terephthalate (PET), polyethylene naphthalate (PEN), polypropylene terephthalate, and polybutylene terephthalate, or mixtures of these, or copolyester films in which any one of the above mentioned polyesters is present. For example, a film of polyethylene terephthalate/isophthalate (PETIP) copolyester may be used according to the invention. Another suitable example is film made from a copolyester of PET and PEN. Typically, PET will be used.

In the typical manufacture of polyester film, polyester resin is melted and extruded as an amorphous sheet onto a polished revolving casting drum to form a cast sheet of the polymer. Thereafter, the cast sheet of polymer is heated to just above its glass transition temperature, 80° C. to 100° C. for polyethylene terephthalate, and is generally stretched or drawn in one or more directions. Typically it is stretched in two directions: the direction of extrusion (longitudinal direction), and perpendicular to the direction of extrusion (transverse direction) to produce a biaxially orientated film. The first stretching, which imparts strength and toughness to the film, conventionally increases the original length of the film by a factor of from about 2.0 to about 4.0. Subsequent stretching steps each also increase the size of the film about 2.0 to about 4.0 times. Generally, it is preferred to stretch first in the longitudinal direction and then in the transverse direction. The film is then heat set, generally at a temperature in the range of about 190° C. to 240° C. for polyethylene terephthalate, to lock in the strength, toughness, and other physical properties, and then cooled down prior to winding on a roll.

The present invention adds to this process a step of coating the substrate with an anti-fog and anti-glare composition on one or both sides of the film substrate. In the case of a polyester, a number of suitable ways of doing this may be used. The process for coating the anti-fog composition may be conducted either in-line or off-line. All processes involve a final cooldown step, and as used herein, the term "in-line" refers to a coating process that is performed at any point prior to the final cooldown step, and an "off-line" coating process is one in which the coating step is conducted afterward. Nonlimiting examples of using in-line coating processes to make coated films according to the invention will now be presented, using PET as an exemplary polyester.

In a first embodiment of the invention, PET is dried and then melt-extruded into a flat sheet and cooled on a chilled roll or drum to form a substrate layer. The temperature of the cast film is then increased by passing the film over hot rollers (80° C.-85° C.) and heating by infrared heaters. The film is then stretched lengthwise at a draw ratio of 3.4:1. The stretched film is then contacted with chilled rolls (15° C.-25° C.), which reduces the film temperature to minimize crystallization and embrittlement of the film. The film is then coated on one or both sides with the anti-fog and antiglare coating solution. Any suitable roll coating method may be used, or other coating method. The coated film is dried in a tenter frame in two forced air ovens at about 105° C. The film is then drawn in the transverse direction at a ratio of 3.0:1 to 4.5:1 in two ovens operating at 110° C.-130° C. After drawing, the coated film is heat set for about 8 seconds in three heat-setting ovens operating at between 225° C. and 237° C. In a final cooldown step, the film temperature is reduced in an air oven operating at about 165° C.

In another embodiment of the invention, PET is melt-extruded into a flat sheet, cooled on a chilled roll or drum, and passed over hot rollers and heated by infrared heaters as described in the first embodiment. The film is then coated on one or both sides with the anti-fog and antiglare coating solution, and then dried in a tenter frame in two forced air ovens at about 105° C. The film is then drawn in both lengthwise and transverse direction at a ratio of 2.0:1 to 5.0:1 in ovens operating at 110° C.-130° C. After drawing, the coated film is heat set and cooled down as described in the first embodiment.

In yet another embodiment of the invention, the process of the first embodiment is repeated but without the transverse drawing step, thereby producing a uniaxially drawn product.

In still another embodiment, the process of the first embodiment is repeated except that the transverse drawing step is replaced by a second lengthwise draw in two ovens operating at 110° C.-130° C. at a draw ratio of 3.0:1 to 4.5:1, thereby producing a monoaxially drawn product.

Any conventional coating method, such as spray coating, roll coating, slot coating, meniscus coating, immersion coating, wire-bar coating, air knife coating, curtain coating, doctor knife coating, direct and reverse gravure coating, and the like, may be used to apply the coating composition. The coating is typically applied as a continuous wet coating having a thickness in a range from 1.0 to 30 microns, and more typically in a range of 5 to 20 microns, as measured by a wet infrared gauge. After drying, the coating typically has a thickness in a range from 0.025 to 1.5 microns, and more typically in a range of 0.060 to 0.16 microns.

In other embodiments of the invention, a conventional off-line coating process may be used, using any of the wide variety of coating methods known in the art. However, the ability to use in-line coating confers advantages of economy and efficiency over off-line processes (in which the coating step could typically only be conducted after the manufacture of the polyester substrate has been completed) because off-line processes may involve organic solvents and/or require the user to employ inconvenient and costly drying procedures. In contrast, in-line coating by the manufacturer provides a customer with a ready-to-use film, thereby saving the customer from having to provide time and equipment to unwind the uncoated film, coat it, and then rewind it.

If an in-line process is used, the coating composition is typically applied before final drawing of the film. For a uniaxially drawn film, the coating composition is preferably applied after drawing. For a biaxially or monoaxially orientated film, the coating composition is typically applied during an interdraw stage, that is, after the film has already been stretched but prior to a second stretching.

In some embodiments, one or (more typically) both sides of the substrate may be coated with a "slip coating" comprising a particulate material in order to assist in the handling of the film, for instance to improve windability and minimize or prevent "blocking". Such a coating may for example be applied in-line after film orientation and before final winding. The slip coating may be applied to either side of the substrate, or both. Suitable slip coatings may comprise potassium silicate, such as that disclosed in, for example, U.S. Pat. Nos. 5,925,428 and 5,882,798, the disclosures of which is incorporated herein by reference. Alternatively, a slip coating may comprise a discontinuous layer of an acrylic and/or methacrylic polymeric resin optionally further comprising a cross-linking agent, as disclosed in, for example, EP-A-0408197.

EXAMPLES

Glossary

The following materials are referred to in the Examples, and are identified here.

AQUAZOL® 5 poly-2-ethyl-2-oxazoline (Polymer Chemistry Innovations, Inc., Tucson, Ariz.), used as 10% solution.

COATOSIL® 1770 2-(3,4-epoxycyclohexyl)ethyltriethoxysilane, water-borne (Momentive Performance Materials, Wilton, Conn.), 100% solids.

CYMEL® 350 alkylated melamine-formaldehyde resin (Cytec Industries, Inc., West Paterson, N.J.), used as 20% solution.

D.E.R.™ 732 liquid epoxy resin, reaction product of epichlorohydrin and polypropylene glycol (Dow Chemical Company, Midland, Mich.), 100% solids.

DISPAL® 23N4-80 boehmite alumina powder (Sasol North America Inc., Houston, Tex.), 100%.

DISPAL® 23N4-20 boehmite alumina sol, 20% solution (Sasol North America Inc., Houston, Tex.).

EPOCROS™ WS-700 oxazoline-functional water-soluble copolymer (Nippon Shokubai Co., LTD, Osaka, Japan), 25% solution.

KLUCEL® E hydroxypropylcellulose (Hercules Incorporated, Wilmington, Del.), used as 10% solution.

MASIL® 1066C polymeric nonionic silicone surfactant with a comb or rake structure consisting of a polydimethylsiloxane backbone with graft or pendant polyoxyalkylene hydrophiles (PPG Industries, Inc., Gurnee, Ill.), 100% solids.

NATROSOL® hydroxyethylcellulose (Hercules Incorporated, Wilmington, Del.), 100% solids.

SMA 1440H, Styrene Maleic Anhydride Copolymer Solution (Sartomer Company, Exton, Pa.) used as 34% solution. It is a solution of the ammonia salt of a styrene maleic anhydride copolymer partial monoester, having an $M_w$ of 7000, an $M_n$ of 2800, an acid number of 185, and a Tg of 60° C.

SMA 2625H, Styrene Maleic Anhydride Copolymer Solution (Sartomer Company, Exton, Pa.) used as 25% solution. It is a solution of the ammonia salt of a styrene maleic anhydride copolymer partial monoester, having an $M_w$ of 9000, an $M_n$ of 3600, an acid number of 220, and a Tg of 110° C.

SNOWTEX-UP® colloidal silica (Nissan Chemical Industries, LTD, Tokyo, Japan), 20% dispersion.

SYTON® HT-50 colloidal silica slurry (DA NanoMaterials LLC, Tempe, Ariz.), 50% dispersion.

TEGO-WET® 251 polyether modified polysiloxane surfactant (Tego Chemie Service GmbH, Division of Degussa, Essen, Germany), 100% solids.

TYZOR® LA lactic acid, titanium chelate, ammonium salt, water based titanate(2-), dihydroxy bis[2-hydroxypropanato(2-)—$O^1$, $O^2$], ammonium salt (DuPont, Wilmington, Del.), 50% solution.

Sample Testing

The anti-glare property of films was determined by Total Luminous Transmission (TLT), measured on an XL 211 Hazeguard™ or Hazeguard™ Plus system, available from BYK Gardner of Columbia, Md. using ASTM method D1003-92. Higher TLT value means less glare, with a value above 94 being considered the minimum acceptable for good anti-glare performance.

Haze, which is caused by light diffused in all directions and which results in a loss of contrast, was also evaluated. ASTM D 1003 defines haze as that percentage of light which in passing through deviates from the incident beam greater than 2.5 degrees on the average. Haze was measured with a BYK Gardner "Haze Gard Plus" instrument (BYK-Gardner USA, Columbia, Md.) using ASTM D 1003-61, procedure A.

Anti-fog characteristics of films were evaluated by the following method:

Ambient Testing

A sample of film was placed over the mouth of a 4 oz. jar containing 60 ml of water at 50° C., and the assembly was maintained at ambient temperature and the time elapsed until the film surface became visibly foggy was recorded. If no fog was found by 5 minutes elapsed time, the test was discontinued.

Refrigerated Testing

A sample of film was placed over the mouth of a 4 oz. jar containing 60 ml of water at 2-5° C. (35-40° F.). The jar was placed in a refrigerator held at 2-5° C., and the time elapsed until the film surface became visibly foggy was recorded, as well as the time until the fog subsequently disappeared. Finally, the time at which the first condensation (visible droplets of water) appeared was noted. Condensation was evaluated at 1 minute, 2 minutes, 2 hours and 24 hours after placing the film on the jar. A notation that no fog was formed at ambient and refrigerated temperatures means that no fog was visible at any of the 1-minute, 2-minute, 2-hour, or 24-hour evaluations.

Example 1

To produce the coating formulation, the following components were added to 59.4 parts by weight of water under agitation:

37.28 parts by weight of a 10 wt % aqueous KLUCEL® E hydroxypropylcellulose solution, 1.52 parts by weight of EPOCROS™ WS-700 oxazoline-functional water-soluble copolymer, 0.4 parts by weight of TEGO-WET® 251 polyether modified polysiloxane surfactant, 1.4 parts by weight of SNOWTEX-UP® colloidal silica.

The coated film was prepared as follows. PET was dried and then melt-extruded into a flat sheet and cooled on a chilled roll to form a substrate layer. The temperature of the cast film was then increased by passing the film over hot rollers (80° C.-85° C.) and heating by infrared heaters. The film was then stretched lengthwise at a draw ratio of 3.4:1. The stretched film was then contacted with chilled rolls (15° C.-25° C.), which reduces the film temperature to minimize crystallization and embrittlement of the film. The film was then roll-coated on both sides with the anti-fog and antiglare coating formulation. Wet coating thickness, measured by an infra-red gauge, was 7.4 to 9.4 microns. The coated film was dried in a tenter frame in two forced air ovens at about 105° C. The film was then drawn in the transverse direction at a ratio of 3.0:1 to 4.5:1 in two ovens operating at 110° C.-130° C. After drawing, the coated film was heat set for about 8 seconds in three heat-setting ovens operating at between 225° C. and 237° C. In a final cooldown step, the film temperature was reduced in an air oven operating at about 165° C. Dry coating thickness was 0.08 to 0.1 micron as measured on the finished film. The total Luminous Transmission was 96.4, indicating excellent anti-glare performance, and the haze value was 1.07. The film showed very good anti-fog properties, no fog being formed at ambient and refrigerated temperatures.

Example 2

Using a method similar to that of Example 1, the following components were added to 67.12 parts by weight of water under agitation:

31.6 parts by weight of a 10 wt % aqueous KLUCEL® E hydroxypropylcellulose solution, 0.35 parts by weight of D.E.R.™ 732 liquid epoxy resin, 0.4 parts by weight of TEGO-WET® 251 polyether modified polysiloxane, surfactant, 0.52 parts by weight of SYTON® HT-50 colloidal silica slurry.

The coating formulation was applied to a polyethylene terephthalate substrate as in Example 1. Total Luminous Transmission value was 96.3, indicating excellent anti-glare performance, and the haze value was 1.37. The film showed very good anti-fog properties, no fog being formed at ambient and refrigerated temperatures.

Example 3

Using a method similar to that of Example 1, the following components were added to 60.56 parts by weight of water under agitation:

37.28 parts by weight of a 10 wt % aqueous KLUCEL® E hydroxypropylcellulose solution, 0.38 parts by weight of COATOSIL® 1770 2-(3,4-epoxycyclohexyl)ethyltriethoxysilane, 0.4 parts by weight of TEGO-WET® 251 polyether modified polysiloxane surfactant, 1.4 parts by weight of SNOWTEX-UP® colloidal silica.

The coating formulation was applied to a polyethylene terephthalate substrate as in Example 1. Total Luminous Transmission value was 96.2, indicating excellent anti-glare performance, and the haze value was 2.13. The film showed very good anti-fog properties, no fog being formed at ambient and refrigerated temperatures.

Example 4

Using a method similar to that of Example 1, the following components were added to 59.04 parts by weight of water under agitation:

37.28 parts by weight of a 10 wt % aqueous KLUCEL® E hydroxypropylcellulose solution, 1.88 parts by weight of CYMEL® 350 alkylated melamine-formaldehyde resin, 0.4 parts by weight of TEGO-WET® 251 polyether modified polysiloxane surfactant, 1.4 parts by weight of SNOWTEX-UP® colloidal silica.

The coating formulation was applied to a polyethylene terephthalate substrate as in Example 1. Total Luminous Transmission value was 96.1, indicating excellent anti-glare performance, and the haze value was 4.07. The film showed very good anti-fog properties, no fog being formed at ambient and refrigerated temperatures.

Example 5

Using a method similar to that of Example 1, the following components were added to 60.16 parts by weight of water under agitation:

37.28 parts by weight of a 10 wt % aqueous KLUCEL® E hydroxypropylcellulose solution, 0.76 parts by weight of TYZOR® LA titanium chelate, 0.4% by weight of TEGO-WET® 251 polyether modified polysiloxane surfactant, 1.4% by weight of SNOWTEX-UP® colloidal silica.

The coating formulation was applied to a polyethylene terephthalate substrate as in Example 1. Total Luminous Transmission value was 96.2, indicating excellent anti-glare performance, and the haze value was 1.93. The film showed very good anti-fog properties, no fog being formed at ambient and refrigerated temperatures.

Comparative Example 6

Using a method similar to that of Example 1, the following components were added to 97.35 parts by weight of water under agitation:

0.85 parts by weight of NATROSOL® hydroxyethylcellulose, 1.70 parts by weight of DISPAL® 23N4-80 boehmite alumina powder, 0.025 parts by weight of TEGO-WET® 251 polyether modified polysiloxane surfactant, 0.025 parts by weight of MASIL® 1066C polymeric non-ionic silicone surfactant.

The anti-fog coating was applied to a polyester film (ICI) using a No. 24 Meyer rod. The coating was dried in an oven at about 150° C. for about 2 minutes. Total Luminous Transmission value was 92.3, which does not meet the requirement for anti-glare, and the haze value was 3.11. The film showed very poor anti-fog properties, showing fog that formed immediately and did not go away at ambient temperature.

Comparative Example 7

Using a method similar to that of Example 1, the following components were added to 83.6 parts by weight of water under agitation:

12.8 parts by weight of a 10 wt % aqueous KLUCEL® E hydroxypropylcellulose solution, 3.2 parts by weight of DISPAL® 23N4-20 boehmite alumina sol, 20%, 0.4 parts by weight of TEGO-WET® 251 polyether modified polysiloxane surfactant.

The coating formulation was coated onto polyethylene terephthalate film at the interdraw stage during the manufacture of the film. Total Luminous Transmission value was 91.1, which does not meet the requirement for anti-glare. The haze value was 3.39. The coating also broke into cracked pieces as a result of the transverse draw operation, and thus was not suitable for in-line application to polyester films.

Example 8

Using a method similar to that of Example 1, the following components were added to 66.12 parts by weight of water under agitation:

31.52 parts by weight of AQUAZOL® 5 poly-2-ethyl-2-oxazoline, 1.44 parts by weight of EPOCROS™ WS-700 oxazoline-functional water-soluble copolymer, 0.4 parts by weight of TEGO-WET® 251 polyether modified polysiloxane surfactant, 0.52 parts by weight of SYTON® HT-50 colloidal silica slurry.

Total Luminous Transmission value was 95.2, indicating good anti-glare performance, and the haze value was 2.23. The film showed very good anti-fog properties, no fog was formed at ambient and refrigerated temperatures.

Example 9

Using a method similar to that of Example 1, the following components were added to 60.92 parts by weight of water under agitation:

37.28 parts by weight of a 10 wt % aqueous KLUCEL® E hydroxypropylcellulose solution, 0.4 parts by weight of TEGO-WET® 251 polyether modified polysiloxane surfactant, 1.4 parts by weight of SNOWTEX-UP® colloidal silica.

The coating formulation was coated onto polyethylene terephthalate film at the interdraw stage during the manufacture of the film. Total Luminous Transmission value was 95.0, indicating anti-glare performance. However, the haze was 5.25%, which is quite high. The film showed very good anti-fog properties, with no fog being formed at ambient and refrigerated temperatures. Under the same process and condition, a film coated with the formulation with 1.52 parts of crosslinker EPOCROS™ WS-700 (a repeat of Example 1 above) gave a Total Luminous Transmission value of 95.5, indicating excellent anti-glare performance, but also a haze of only 0.87%, far clearer than the 5.25% values obtained without the crosslinker.

Example 10

Using a method similar to that of Example 1, the following components were added to 85.97 parts by weight of water under agitation:

9.29 parts by weight of a 22 wt % aqueous KLUCEL® E hydroxypropylcellulose solution, 3.7 parts by weight of SMA 1440H Styrene Maleic Anhydride Copolymer Solution, 0.6 parts by weight of TEGO-WET® 251 polyether modified polysiloxane, surfactant, 0.44 parts by weight of SYTON® HT-50 colloidal silica slurry.

The coating formulation was applied to a polyethylene terephthalate substrate as in Example 1. Total Luminous Transmission value was 96.2, indicating excellent anti-glare performance, and the haze value was 0.7. The film showed very good anti-fog properties, no fog being formed at ambient and refrigerated temperatures.

Example 11

Using a method similar to that of Example 1, the following components were added to 84.63 parts by weight of water under agitation:

9.29 parts by weight of a 22 wt % aqueous KLUCEL® E hydroxypropylcellulose solution, 5.04 parts by weight of SMA 2625H Styrene Maleic Anhydride Copolymer Solution, 0.6 parts by weight of TEGO-WET® 251 polyether modified polysiloxane, surfactant, 0.44 parts by weight of SYTON® HT-50 colloidal silica slurry.

The coating formulation was applied to a polyethylene terephthalate substrate as in Example 1. Total Luminous Transmission value was 95.9, indicating excellent anti-glare performance, and the haze value was 1.1. The film showed very good anti-fog properties, no fog being formed at ambient and refrigerated temperatures.

Although the invention is illustrated and described herein with reference to specific embodiments, the invention is not intended to be limited to the details shown. Rather, various modifications may be made in the details within the scope and range of equivalents of the claims without departing from the invention.

What is claimed:

1. A composite film comprising a polyester film substrate having first and second sides, and on at least one of said first and second sides a coating comprising a polymer selected from the group consisting of hydroxypropylcellulose, poly(2-ethyl-2-oxazoline) and mixtures of these, a surfactant, colloidal silica, and an ammonia salt of a styrene maleic anhydride copolymer partial monoester.

2. The composite film of claim 1, wherein the coating is on both of the first and second sides.

3. The composite film of claim 1, wherein the polymer is hydroxypropylcellulose.

4. The composite film of claim 1, wherein the composite film forms part of an optical device.

5. A method of making a composite film, comprising the steps of:
   a) providing an unoriented or monoaxially oriented polyester film substrate having first and second sides;
   b) forming on at least one of said first and second sides coating comprising a polymer selected from the group consisting of hydroxypropylcellulose, poly(2-ethyl-2-oxazoline) and mixtures of these, a surfactant, colloidal silica, and an ammonia salt of a styrene maleic anhydride copolymer partial monoester, said forming comprising contacting said at least one side with a dispersion of the polymer, surfactant, colloidal silica and ammonia salt of a styrene maleic anhydride copolymer partial monoester in an aqueous diluent and then evaporating the aqueous diluent; and
   c) subsequent to step b), stretching the unoriented or monoaxially oriented polyester film substrate to respectively monoaxially or biaxially orient the substrate.

6. The method of claim 5, further comprising, after step c),
   d) heat setting the polyester substrate.

7. The method of claim 5, wherein the substrate of step a) is monoaxially oriented.

8. The method of claim 5, wherein step b) comprises forming a coating on both of the first and second sides.

9. The method of claim 5, wherein the polymer is hydroxypropylcellulose.

10. A polymeric or glass article having on a surface thereof a coating comprising a polymer selected from the group consisting of hydroxypropylcellulose, poly(2-ethyl-2-oxazoline) and mixtures of these, a surfactant, colloidal silica, and an ammonia salt of a styrene maleic anhydride copolymer partial monoester.

11. A composition for coating an article, wherein the composition comprises, in an aqueous diluent, a dispersion comprising a polymer selected from the group consisting of hydroxypropylcellulose, poly(2-ethyl-2-oxazoline) and mixtures of these, a surfactant, colloidal silica, and an ammonia salt of a styrene maleic anhydride copolymer partial monoester.

12. A coating comprising a polymer selected from the group consisting of hydroxypropylcellulose, poly(2-ethyl-2-oxazoline) and mixtures of these, a surfactant, colloidal silica, and an ammonia salt of a styrene maleic anhydride copolymer partial monoester.

* * * * *

UNITED STATES PATENT AND TRADEMARK OFFICE
CERTIFICATE OF CORRECTION

| | | |
|---|---|---|
| PATENT NO. | : 8,568,892 B2 | Page 1 of 1 |
| APPLICATION NO. | : 12/740235 | |
| DATED | : October 29, 2013 | |
| INVENTOR(S) | : Chen Zhao et al. | |

It is certified that error appears in the above-identified patent and that said Letters Patent is hereby corrected as shown below:

On the Title Page Item 75, inventor's name is corrected to --Voisin--.

In the Claims

At Column 13, claim 5(b), line 5, the word --a-- has been added after the word "sides".

Signed and Sealed this
Twentieth Day of May, 2014

Michelle K. Lee
*Deputy Director of the United States Patent and Trademark Office*

UNITED STATES PATENT AND TRADEMARK OFFICE
CERTIFICATE OF CORRECTION

PATENT NO.       : 8,568,892 B2                                           Page 1 of 1
APPLICATION NO. : 12/740235
DATED            : October 29, 2013
INVENTOR(S)      : Zhao et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 622 days.

Signed and Sealed this
Fifteenth Day of September, 2015

Michelle K. Lee
*Director of the United States Patent and Trademark Office*